Patented Mar. 16, 1937

2,074,015

UNITED STATES PATENT OFFICE 2,074,015

PACKING MATERIAL FOR SEALING JOINTS

Leo J. Clapsadle, Buffalo, N. Y., assignor, by mesne assignments, to Union Carbide and Carbon Corporation, a corporation of New York No Drawing. Application May 31, 1933, Serial No. 673,771

5 Claims. (Cl. 106—7.6)

The invention relates to packing material for sealing joints, valve glands, and the like, and is directed more specifically to packing material adapted to seal joints to prevent the leakage of compressed gases.

In equipment for the handling of compressed gases, for example air, oxygen, nitrogen, hydrogen, or hydrocarbons, means must be provided to seal moving or movable parts, such as compressor piston rods and valve stems, against leakage of the compressed gas. Crimps and packing of oil-free wax-impregnated tanned leather have been used for this purpose. The wax that is chosen for impregnation of the leather is commonly a hard high melting point wax such as carnauba wax or mixtures thereof with Montan wax, beeswax or various paraffin waxes. When oxygen is the gas to be handled, it is of prime importance that the impregnating wax possess a high flash point.

At the low temperatures frequently attained in handling compressed gases, for example, in the valves of compressed gas cylinders, the waxes used for impregnating the leather packing become extremely hard, so that at times it becomes impossible to make a tight seal. This difficulty arises most frequently, perhaps, with the extremely hard, high flash point waxes generally used in compressed oxygen apparatus.

An object of the invention is to provide impregnated leather packing material which will remain relatively soft and pliable at low temperatures and which also will form a gas-tight seal at temperatures over a wide range.

Another object of the invention is to provide an impregnated leather packing material having a relatively high flash point.

The invention is a packing material for the purposes above described, comprising non-metallic or metallic fibrous or woven material impregnated with a relatively high melting point wax containing a plasticizer having a relatively high flash point.

The wax used is preferably carnauba wax, although any high melting wax having similar physical properties is suitable. The plasticizer preferably is a halogenated polynuclear compound such as the halogenated naphthalenes, for example chlorinated naphthalene, and the halogenated diphenyls, for example chlorinated diphenyl; or an ester of a phenyl or cresyl compound, for example, tricresyl phosphate or triphenyl phosphate.

A preferred impregnating composition is 60% triorthocresyl phosphate and 40% carnauba wax, although wide variations from this mixture are possible. Generally, the plasticizing agent should form between about 40% and about 80% of the mixture.

The fibrous material may be a wire cloth, an asbestos cloth, a textile cloth, a paper or other cellulosic material, or leather. Leather is a preferred material for many applications of the invention, and this material should be substantially free from oils and preferably tanned.

The packing material of the invention is soft and pliable over a wide range of temperatures, and forms a tight seal under all conditions normally encountered in handling compressed gases.

The material of the invention is particularly valuable for use in apparatus for handling oxygen under pressure, in that the addition of the plasticizing material decreases the hazard of explosion of the packing material.

I claim:

1. Packing material adapted for sealing associated parts against leakage when exposed to oxygen and the like under high pressure, the same comprising a structure of substantially oil-free leather impregnated with a mixture containing a relatively high melting point wax and a plasticizer therefor selected from the group consisting of chlorinated polynuclear compounds, tricresyl esters, and triphenyl esters.

2. Packing material adapted for sealing associated parts against leakage therebetween when exposed to compressed oxygen, the said material being adapted to remain soft and pliable at low temperatures, and consisting of a structure of fibrous material selected from the group consisting of cloth and oil-free leather impregnated with a mixture of a hard high-melting point wax and a plasticizer for the latter selected from the group consisting of chlorinated polynuclear compounds, tricresyl esters, and triphenyl esters.

3. Packing material for sealing joints to prevent the leakage of compressed oxygen, comprising substantially oil-free leather containing carnauba wax and a plasticizer of the group consisting of chlorinated naphthalene, chlorinated diphenyl, tricresyl phosphate, and triphenyl phosphate.

4. Packing material for valve stems and the like, comprising substantially oil-free leather containing carnauba wax and tricresyl phosphate.

5. Packing material for valve stems and the like, comprising substantially oil-free tanned leather containing carnauba wax and tricresyl phosphate in the approximate proportions: 40% carnauba wax, 60% tricresyl phosphate.

LEO J. CLAPSADLE.